Figure 1:
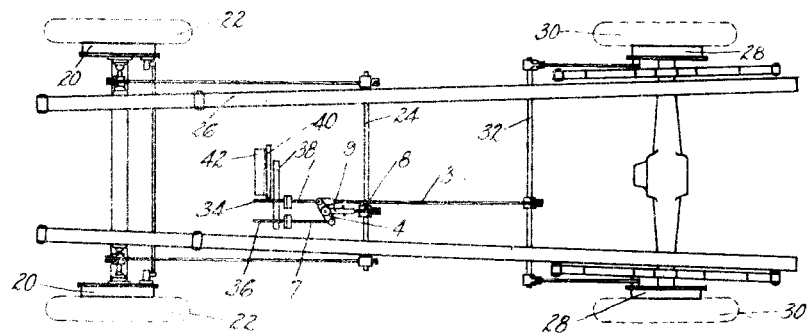

Dec. 27, 1927.

W. J. ANDRES 1,654,357

BRAKE OPERATING MECHANISM

Filed Dec. 11, 1924

INVENTOR
WILLIAM J. ANDRES
BY
ATTORNEY

Patented Dec. 27, 1927.

1,654,357

UNITED STATES PATENT OFFICE.

WILLIAM J. ANDRES, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MECHANISM.

Application filed December 11, 1924. Serial No. 755,153.

This invention relates to a mechanism for inter-linking a plurality of operating members such as the clutch pedal and the brake pedal or pedals and has for one object to provide a mechanism whereby the operator of an automotive vehicle may exert maximum power on all four brakes when necessary but which, under normal braking conditions allows for normal pedal pressure and travel.

Another object of my invention is to provide means whereby the operator of an automotive vehicle may apply the rear brakes only for normal braking, but may apply all four brakes in case of emergency.

A preferred embodiment of the invention provides means whereby the operator of a vehicle may have selective braking, that is to say, he may be able to apply the rear wheel brakes alone, front and rear together, or one set of brakes first and then the other set of brakes, Another feature of my invention relates to arranging the brake-applying means in such a manner that for all normal brake applications, the pedal pressure will be low and the pedal travel small, while, for emergency, the full effect of the four wheel brakes may be obtained without excessive pedal pressure and with any desired ratio between front and rear braking effect.

These and other objects will be apparent after a study of the specification taken in connection with the drawing which shows diagrammatically one arrangement of the parts for carrying my invention into practice.

Figure 2:
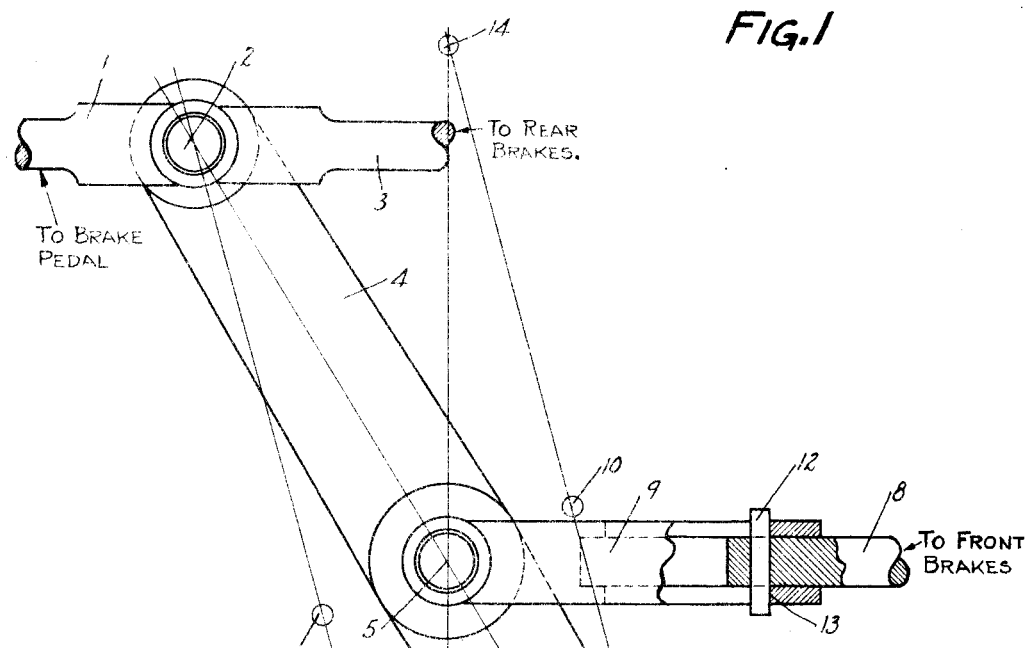

Fig. 1 is a top plan view of an automobile chassis embodying the invention and having brakes on all four wheels; and Fig. 2 is a similar view on a larger scale of part of the operating mechanism.

In the drawing, 1 is a connection from the brake pedal to the pivot point 2, at which point a member 3 extends to the rear wheel brakes. The pivot point 2 is carried on an equalizer bar 4 to which is attached a member 9 at the pivot point 5. A member 7, pivoted to the equalizer bar at 6. extends to the clutch pedal. To the member 9 is fastened a member 8 which connects with the front wheel brakes. the member 8 may be fastened to the member 9 in any satisfactory manner as by means of a pin 12 operating in a slot in the member 9, the bottom of the slot 13 acting as a stop for the pin 12. The distance between the pin 12 and the stop 13 is such that when the brake pedal only is operated to carry the parts in the position shown in full lines, the pin 12 will just engage the stop 13 so that further movement of the point 5 toward 11, the position which point 5 takes when both the clutch and brake pedal are operated, will actuate the member 8.

Fig. 1 shows one manner of arranging this mechanism to operate brakes on all four wheels of an automobile chassis. Brakes 20 on the front wheels 22 are operated by a shaft 24 carried by the chassis frame 26, and rocked to apply the front brakes by member 9. Brakes 28 on the rear wheels 30 are operated by connections from a cross shaft 32 rocked to apply the rear brakes by member 3. The brake pedal is shown at 34, connected to the front end of connection 1, while the clutch pedal 36 not only operates member 7, but also means such as a clutch shaft 38. Shaft 38 operates in any suitable manner a clutch indicated diagrammatically at 40 as housed within the flywheel 42

My invention will be clearly understood by a brief description of its operation as follows:

When the clutch is engaged and all brakes are off or in released position, the three pivot points previously referred to, take the position of 6, 10 and 14, and there is a clearance between the pin 12 and the stop 13. When the clutch is in normal or engaged position and the brake pedal fully actuated, the pivot points of the equalizer bar 4, take the position of 6, 5, 2, as shown in full lines in the drawing and the pin 12 just comes into contact with the stop 13. In this position, the rear brakes only are actuated by the full power of the brake pedal. and the front brakes are not actuated at all.

With the clutch released and a brake pedal not actuated. the pivot points assume the position of 15, 5, 14; the releasing of the clutch not affecting the brake actuating mechanism either front or rear.

When the clutch is released and the brake pedal fully actuated, the pivot points assume the position 15, 11, 2, in which position, the point 5, of the equalizer bar 4, takes the position indicated by 11, and results in the application of the front wheel brakes through the medium of the member 8, as well as the rear brakes through the medium of member 3. Thus the clutch-operating means is so interconnected with the operating means for the rear brakes that the pressure on the front brakes can be increased, or decreased by manipulation of the clutch pedal, which can be pressed downwardly to increase the pressure on the front brakes, or let up slightly to decrease the pressure.

It is a well known fact, that the power required to release a clutch on an automotive vehicle is relatively small, therefore there is an excess of the operator's leg power available for increasing the braking effort and this extra power is utilized in the manner above described. It is obvious that the pivot points 2, 5, 6, in the equalizer bar 4, may be spaced at any suitable distance relative to each other to give varying portions of braking power, both front and rear. By varying these relative positions the varying pedal travel may also be taken care of: In fact, numerous modifications may be made without departing from the spirit of my invention or the scope of the appended claims.

Having thus described my invention what I claim is:

1. In a mechanism of the character described a clutch pedal, a connecting bar, means connecting one end of said bar to the clutch pedal, means connecting the other end of the bar to a brake pedal and also to the rear wheel brakes, and means connected between the front wheel brakes and a point on the bar intermediate its ends as and for the purposes described.

2. In a mechanism of the character described, a clutch pedal, a connecting bar, means connecting one end of said bar to the clutch pedal, means connecting the other end of the bar to a brake pedal, and also to one set of the vehicle brakes, and means connected between another set of the vehicle brakes and a point on the bar intermediate it ends.

3. In combination with a vehicle having front and rear wheel brakes and a clutch with an operating pedal therefor, a connecting bar, means connecting one end of said bar to the clutch pedal, means connecting the other end of the bar to a brake pedal and means connected between the front and rear wheel brakes and the bar at one or more points intermediate the ends of the bar.

4. In a vehicle having two sets of brakes, two operating members, means operated by one of said members for applying one set of brakes, and means operated only by actuation of both of said members to apply the other brakes.

5. In a vehicle having a clutch and retarding means, two operating members, means operated by one of said members for applying operating pressure on the retarding means, means operated by the other of said members to operate the clutch without affecting the retarded means, and means operated by said other operating member jointly with the first member to apply additional pressure on the retarding means.

6. A vehicle having two sets of brakes and operating mechanism therefor including an equalizer bar connected adjacent one end to one set of brakes and between its ends to the other set of brakes, and at least two operating devices, one connected adjacent each end of the bar.

7. A vehicle having two sets of brakes and operating mechanism therefor including an equalizer bar and means connected adjacent one end for operating one set of brakes and means connected between its ends for operating the other set of brakes, and at least two operating devices, one connected adjacent each end of the bar, the two brake-operating means extending from one side of the bar and the operating devices being on the opposite side of the bar.

8. A vehicle having two sets of brakes, an operating device, connections from said device to one set of brakes, a bar pivoted at one end to said connections, another operating device connected to the other end of the bar, and connections from an intermediate part of the bar to the other set of brakes.

9. A vehicle having two sets of brakes, a first operating device, connections from said device to one set of brakes, a bar pivoted at one end to said connections, a second operating device connected to the other end of the bar, and connections from an intermediate part of the bar to the other set of brakes and including parts having lost motion substantially taken up by operation of the first device.

10. Operating connections including a floating bar, connections directly pivoted to one end of the bar and extending in opposite directions therefrom, an operating device directly pivoted to the other end of the bar, and a member having lost-motion connection with the bar between its ends.

11. In combination with a vehicle having two sets of brakes, clutch-actuating means operable without affecting any of the brakes, means for operating one set of brakes without affecting the clutch, and means for interconnecting the clutch-operating means and the brake-operating means and which is operable to increase or decrease the pressure on the other set of brakes.

12. A vehicle having a plurality of brakes and clutch-actuating means and brake-actuating means, the clutch-actuating means being operable without operating any of the brakes and part of the brakes being operable by the brake-actuating means without affecting the clutch or the other brakes, in combination with auxiliary means operable by joint manipulation of said clutch-actuating means and said brake-actuating means for applying said other brakes.

13. A vehicle having, in combination, a plurality of brakes, clutch-actuating means, means for actuating part of the brakes, and a connection between said two means arranged to apply the other brakes.

14. A vehicle having, in combination, a set of front brakes, a set of rear brakes, a device for applying one set of brakes, and clutch-actuating means operable without affecting either set of brakes and which is arranged to cooperate with said device to apply the other set of brakes.

15. A vehicle having, in combination, front and rear sets of brakes, a clutch pedal, a brake pedal, and means operable by said two pedals for operating the clutch without affecting the brakes, or for operating part only of the brakes, or for operating all of the brakes, at the will of the driver.

In testimony whereof, I affix my signature.

WILLIAM J. ANDRES.